United States Patent [19]
Cheng et al.

[11] Patent Number: 6,040,851
[45] Date of Patent: Mar. 21, 2000

[54] SMALL-FORMAT SUBSYSTEM FOR BROADBAND COMMUNICATION SERVICES

[75] Inventors: Vernon Cheng, San Diego; Greg Mauro, La Jolla, both of Calif.

[73] Assignee: Conexant Systems, Inc., Newport Beach, Calif.

[21] Appl. No.: 09/009,662

[22] Filed: Jan. 20, 1998

[51] Int. Cl.[7] .................................................. H04N 7/10
[52] U.S. Cl. ............................................. 348/10; 455/6.2
[58] Field of Search ................... 348/10, 7, 553, 348/552; 455/6.2, 6.3, 4.2

[56] References Cited

U.S. PATENT DOCUMENTS

| | | | |
|---|---|---|---|
| 5,003,591 | 3/1991 | Kauffman et al. | 380/10 |
| 5,459,507 | 10/1995 | Sakuma et al. | 348/10 |
| 5,619,250 | 4/1997 | McClellan | 348/10 |
| 5,768,539 | 6/1998 | Metz et al. | 348/7 |
| 5,771,064 | 6/1998 | Lett | 348/10 |
| 5,835,864 | 11/1998 | Diehl et al. | 455/6.2 |
| 5,915,020 | 6/1999 | Tilford et al. | 380/10 |

*Primary Examiner*—Victor R. Kostak

[57] ABSTRACT

A method and apparatus are claimed that separate network-dependent from network-independent functions in set-top boxes (STBs), including digital consumer appliances and PCs. A receiver subsystem integrates network-dependent tuner, digital demodulation, Forward Error Correction (FEC), descrambling/decryption, and conditional access functions into a very small format (e.g., any of the PCMCIA Type I, II, or III form-factor). This combination of functions comprises a Digital Interface Conditional Access Module (DICAM). The DICAM interfaces with a Set-Top Universal Box (STUB) that includes network-independent functions. The STUB functionality may also be integrated with a consumer electronics (CE) appliance such as a TV, PC, DVD player, etc. The DICAM may also include an interface for "Smartcards" that implement any of the many different varieties of CA functions currently found around the world.

12 Claims, 4 Drawing Sheets

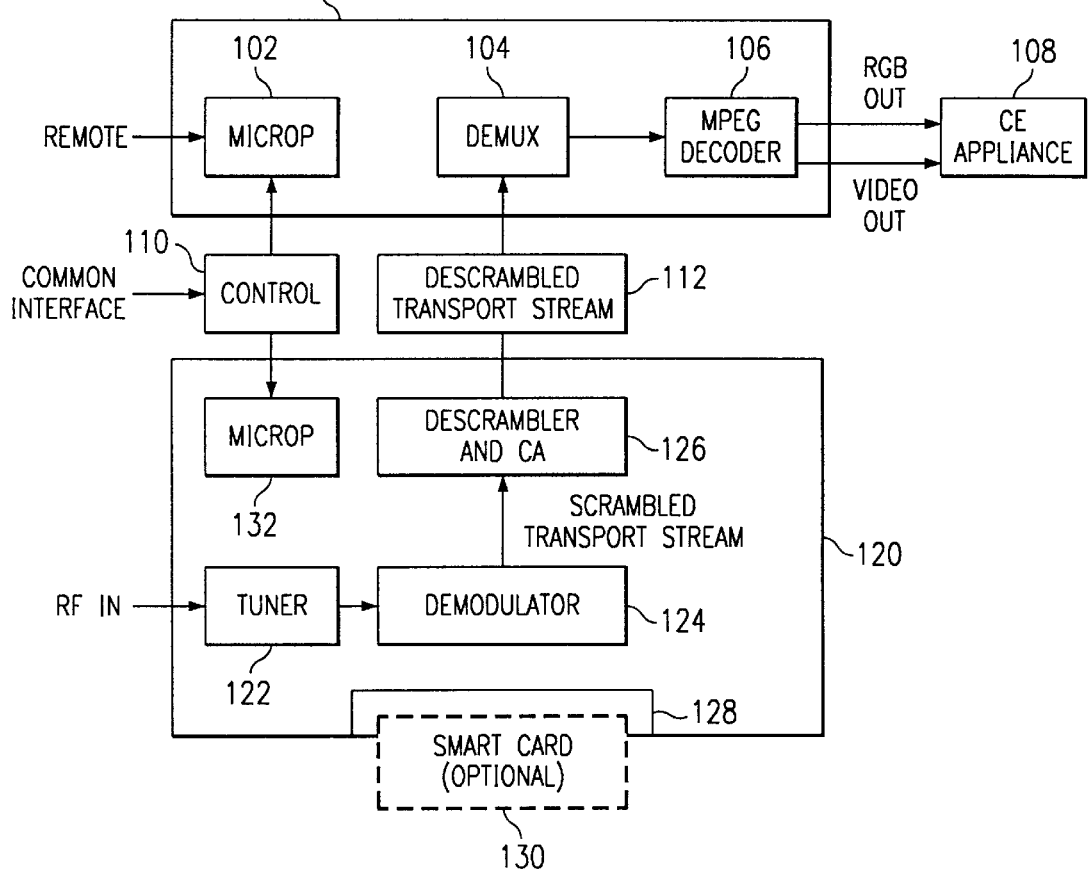

SMALL-FORMAT SUBSYSTEM FOR BROADBAND COMMUNICATION SERVICES

TECHNICAL FIELD

This invention relates to electronic communication systems, and more particularly to electronic receivers/transmitters for broadband communications services.

BACKGROUND

Televisions may receive signals from a variety of sources, such as cable, satellite dishes, video disks, and DVD players. Home personal computers (PCs) may receive data from other types of sources, such as telephone lines, cable modems, and satellite dishes. The trend has been to converge these markets and provide for digital broadband distribution of video and data to both televisions and computers. In addition, other consumer appliances may be coupled to broadband systems in the future.

Digital set-top box ("STBs") receivers are required in order to receive digital broadband distribution of video and data from a communication network. However, worldwide, there are numerous different communication networks which are or will be delivering such broadband services. Examples of such networks include: various Digital Subscriber Line (xDSL) technologies for delivering data over twisted pair telephone lines; cable modems; Hybrid Fiber Coax (HFC) digital cable; Direct Broadcast Satellite (DBS); Multichannel Multipoint Distribution Systems (MMDS), otherwise known as microwave wireless cable; and Local Multipoint Distribution Systems (LMDS). Other communication network technologies are expected to be developed in the future.

Such networks often have a security and conditional access (CA) encryption system to prevent signal theft and allow pay-per-view distribution. However, network operators often wish to select their own 'favored' CA systems. The huge number of possible combinations of different networks coupled with unique CA systems means that equipment manufacturers need to build many different models of STBs to receive each type of signal. The number of required STBs increases as international networks are taken into consideration.

This situation prohibits manufacturers from designing a 'common' platform STB for use in all networks. This inability has a number of consequences, including: an inability to consolidate research & development and manufacturing to gain economies-of-scale for lower unit cost; unit volumes are limited for each STB manufacturer; different consumer electronics products have redundant functions; artificially higher STB prices; an inability to market through retail channels; high carrying costs for complete products for network operators; fewer suppliers/manufacturers, leading to higher costs for network operators.

SUMMARY

The invention includes a method and apparatus that separates network-dependent from network-independent functions in set-top boxes (STBs), including digital consumer appliances and PCs. A receiver subsystem integrates network-dependent tuner, digital demodulation, Forward Error Correction (FEC), descrambling/decryption, and conditional access functions into a very small format (e.g., any of the PCMCIA Type I, II, or III form-factor). This combination of functions comprises a Digital Interface Conditional Access Module (DICAM). The DICAM interfaces with a common module, or Set-Top Universal Box (STUB), that includes network-independent functions. The STUB functionality may also be integrated with a consumer electronics (CE) appliance such as a TV, PC, DVD player, etc. The DICAM may also include an interface for "Smartcards" that implement any of the many different varieties of CA functions currently found around the world.

More particular, the invention includes an electronic broadband network communication system comprising (1) a separate, connectable network-dependent digital interface conditional access module (DICAM) configured to receive an RF audiovisual signal, and generate therefrom an error corrected digital signal in a transport stream; and (2) a separate network-independent common module configured to be coupled to and electronically communicate with the DICAM, for receiving the transport stream and generating at least a video output signal therefrom.

The invention enables manufacturers to separate out all network-dependent and CA-dependent functions onto a small, user-installable module. This means manufacturers can mass-produce STUBs which contain only common functions to all networks. As noted above, the STUB functionality may also be integrated with a consumer electronics (CE) appliance such as a TV, PC, DVD player, etc., to make them ready for the digital audio video MPEG standard. Advantages of the invention include: better leveraged research & development; lower costs to network operators for STUBs because more manufacturers can build the common platforms; an ability to leverage consumer retail channels to reach more subscribers, more rapidly; elimination of high-cost carrying charges by network operators, who need not buy whole STBs but just the small DICAM units containing the network-specific and CA functions desired by each operator.

As the world moves towards "MPEG-ready" devices such as PCs, DVD players, TVs, STBs, stereo sound systems, etc., more and more these consumer products will have standard interfaces and functions. Common to all will be MPEG processing/decoding, graphics, CPU functions, etc. Using different pluggable DICAM modules with a single STUB embodying these functions, a user can receive: broadband data from a satellite in a PC; broadband interactive 2-way data over cable in a PC; broadband interactive xDSL data over phone lines in a PC; digital video over cable directly in a TV; digital video from a satellite in a DVD-RAM for recording at home; digital audio from a satellite in a stereo system and/or TV; etc.

The invention would also allow a user to buy an "MPEG-ready" DVD, PC, TV, or other CE product at a retail outlet. Thereafter, wherever the user moves or lives, the user can sign up for whatever service is available and receive broadband information into each appliance just by changing DICAMs.

The details of one or more embodiments of the invention are set forth in the accompanying drawings and the description below. Other features, objects, and advantages of the invention will be apparent from the description and drawings, and from the claims.

DESCRIPTION OF DRAWINGS

FIG. 2A shows a PCMCIA embodiment of a DICAM, while FIG. 2B shows a rear view of a STUB or CE appliance (e.g., a digital TV) having a matching PCMCIA socket connector.

FIG. 3 is block diagram showing a more specific preferred division of typical network-dependent and network-independent functions in accordance with the invention.

Like reference numbers and designations in the various drawings indicate like elements.

DETAILED DESCRIPTION

Figure 1:
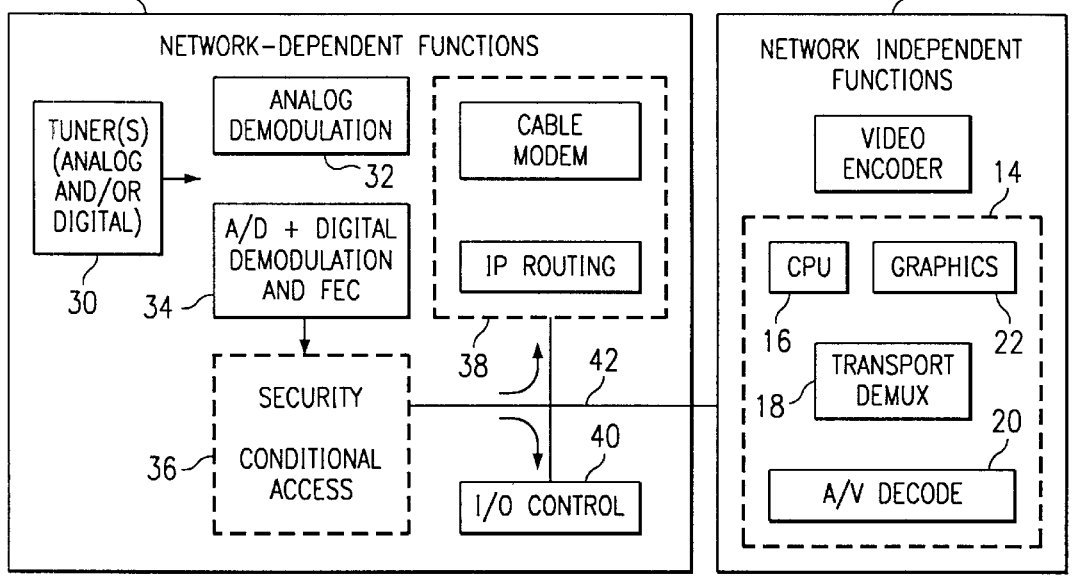
FIG. 1 is block diagram showing a preferred division of typical network-dependent and network-independent functions in accordance with the invention.

FIG. 1 is block diagram showing a preferred division of typical network-dependent functions 10 and network-independent functions 12 in accordance with the invention. Common network-independent functions 12 that typically would be implemented in a Set-Top Universal Box (STUB) include:

An audiovideo processing unit 14 that typically would include a central processing unit (CPU) 16, a transport demultiplexer 18 for separating data and commands from an incoming transport data stream, an audiovideo decoder 20 (such as a conventional MPEG2 and Dolby™ decoder) for generating respective audio and video outputs from the incoming data and commands, and a graphics module 22 for rendering digital video graphics data for display for output to a computer monitor.

A video encoder 24 for generating a television-compatible output signal, and preferably compatible with the NTSC, PAL, or SECAM broadcast video standards.

Other modules may be provided as desired. For example, memory is provided as necessary, and various input/output ports may be provided, such as an infrared remote control interface, IEEE 1394 ("FireWire") interface, etc.

Network-dependent functions 10 that typically would be implemented in a Digital Interface Conditional Access Module (DICAM) include:

A tuner 30 for receiving an analog or digitally-modulated radio frequency (RF) signal from a selected source (e.g., an audiovideo signal from a source such as an xDSL line, cable modem, HFC digital cable, DBS system, MMDS system, LMDS, etc.) and for selecting a portion of the RF audiovisual signal. The tuner 30 generally would be configured differently for each type of source, to accommodate different signaling protocols, broadband frequencies, etc.

An analog demodulation module 32 for converting the signal selected from the RF audiovisual signal to an analog baseband signal.

An analog-to-digital module 34 for converting a received analog baseband signal to digital, and/or demodulating a received digital signal, and for performing conventional forward error correction on the digital signal.

A connector site for accommodating an optional security-and-conditional access (CA) module 36 which, when present, controls descrambling/decrypting and further dissemination (i.e., access) of the digital signal. Alternatively, a CA module 36 may be integrated within a DICAM.

An optional data interface 38, such as for a cable modem having Internet Protocol (IP) routing capability.

An input/output (I/O) control processor 40 for controlling overall DICAM functionality and data flows over a bus 42 connecting the network-dependent functions 10 with the network-independent functions 12.

Other functions may be included within either the DICAM or the STUB as desired. However, the network-dependent functions 10 within the DICAM should generally comprise a complete receiver subsystem.

The DICAM is preferably implemented so as to be plug-compatible with a corresponding socket within a STUB. For example, the network-dependent functions 10 are preferably implemented within a PCMCIA Type I, II, or III form-factor device.

Figure 2B:
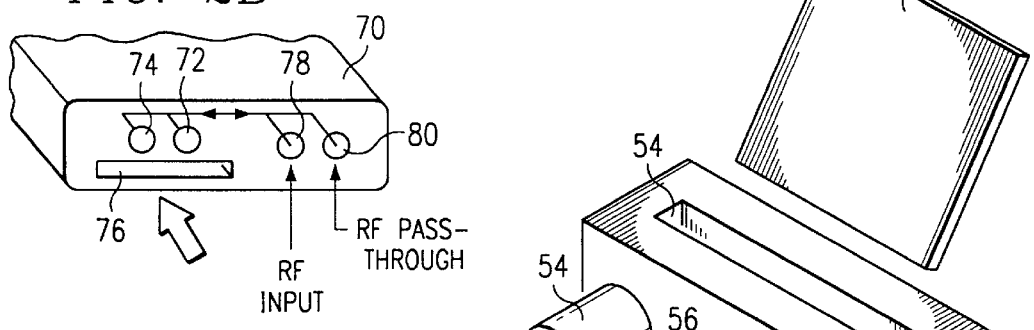
FIGS. 2A and 2B are block diagrams showing a preferred physical implementation of the invention.
Figure 2A:
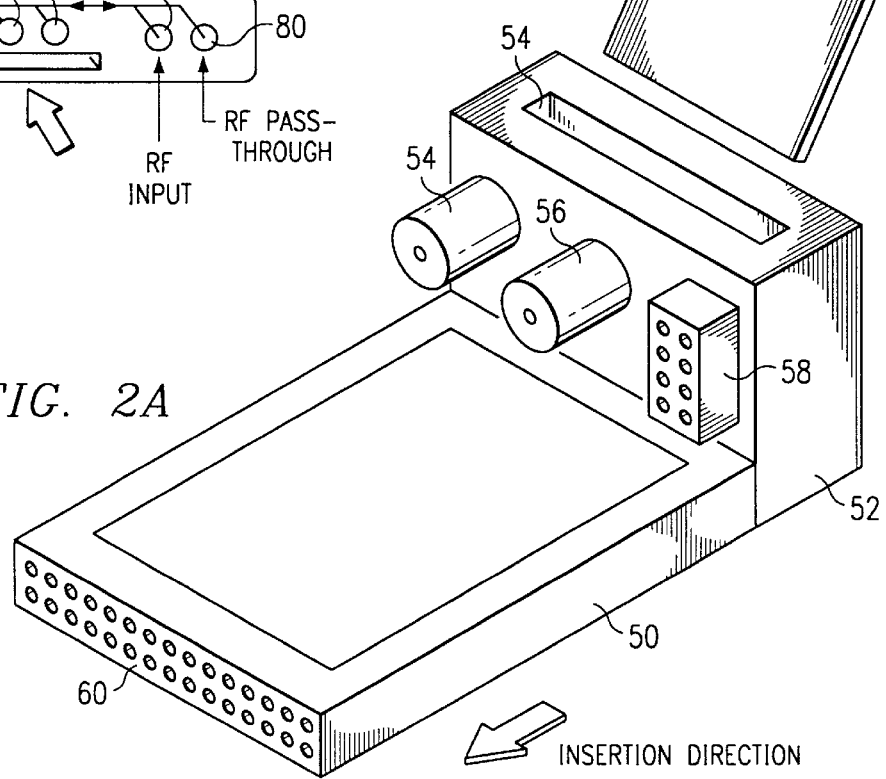

FIG. 2A is block diagram showing a preferred physical implementation of the invention. The network-dependent functions 10 shown in FIG. 1 may be implemented as CMOS and/or bipolar integrated circuits (ICs) mounted within a PCMCIA Type II DICAM chassis 50. For example, in implementing the invention at least one type of signal source, a suitable tuner circuit 30 includes the HM1811 Direct Down Conversion Tuner IC available from Rockwell Semiconductor Systems of San Diego, Calif.

The DICAM chassis 50 may have an extension box 52 for easily mounting RF connectors (e.g., an input RF connector 54 and, optionally, an output RF connector 56) and/or an auxiliary power connector 58 through a connector interface 60. The connector interface 60 in the illustrated embodiment conforms to the PCMCIA standard in terms of mechanical specifications.

To reduce costs and promote compatibility, the connector interface 60 for the DICAM preferably uses an existing signaling protocol and bus architecture capable of handling audiovideo data streams and signals, such as the National Renewable Security Standard Bus (NRSS-B) interface proposed by the NRSS joint standards committee of the Electronics Industries Association (EIA) and National Cable Television Association (NCTA), or the DVB-CI interface proposed by the Digital Video Broadcasting (DVB) consortium in Europe.

FIG. 2B shows a rear view of a STUB or CE appliance 70 having a PCMCIA socket connector 72 and RF connectors 74, 76 matching the corresponding connectors on the DICAM chassis 50 shown in FIG. 2A. The STUB or CE appliance 70 may have separate RF input and pass-through connectors 78, 80 as well. As noted above, the STUB functionality may also be integrated within a CE appliance such as a TV, PC, DVD player, etc.

An advantage of the RF connector configuration shown in FIGS. 2A and 2B is that the entire unit is mechanically robust since the input RF connector 54 and optional output RF connector 56 mate internally within the STUB or CE appliance 70. The DICAM need not have RF connectors on the outer side of the extension box 52 connected to the STUB or CE appliance 70 by means of jumper connections or the like. Another advantage of this configuration is that the "blind" mated RF connectors may be more easily electrically shielded within the STUB or CE appliance 70.

The DICAM may also include an interface for "Smartcards" that implement any of the different varieties of CA functions currently found around the world. Thus, for example, the DICAM chassis 50 and/or extension box 52 may be adapted in known fashion to include a Smartcard reader. Smartcards are essentially electronic cards that provide security services for such functions as credit card accesses, ATM machines, etc. The Smartcard may be a "thumbnail" card similar to those used in GSM cellular phones, or a "credit card" size card which slides in from the outside of the extension box 50 into the flat part of the PCMCIA Type II DICAM chassis 50. For purposes of illustration only, a Smartcard 82 is shown above a reader slot 84 in the top surface of the extension box 50.

The Smartcard may be configured to provide encryption and/or conditional access processing, such that the DICAM will not provide a usable output signal until authorized by a suitable Smartcard. An advantage of having a separable CA function is that the same DICAM units may be used in various similar broadband communication systems that differ only in their encryption or conditional access methods, thus achieving further economies of scale.

FIG. 3 is block diagram showing a more specific preferred division of typical network-dependent and network-independent functions in accordance with the invention. A STUB 100 including a microprocessor 102, demultiplexer 104 and decoder 106 receives remote control signals in conventional fashion, and provides either or both of an RGB output (e.g., for a PC) and video output to one or more CE appliances 108. The STUB 100 receives control signals 110 and a descrambled transport stream 112 from a DICAM 120, preferably through a common, industry standard interface such as noted above. The STUB 100 may also include a conventional tuner and demodulator (not shown) for directly processing input RF signals.

The DICAM 120 receives an RF input signal within a tuner module 122, which provides a selected signal to a demodulator module 124. The output of the demodulator module 124 is coupled to a descrambler and conditional access module 126, which generates the descrambled transport stream 112 when authorized. The functions performed by the descrambler and conditional access module 126 are preferably compliant with the NRSS-B standard.

As noted above, a Smartcard interface 128 may be provided so that the CA functionality may be provided by means of a Smartcard 130 rather than integrated within the DICAM 120. The overall function of the DICAM 120 is controlled by a microprocessor 132.

Figure 4:
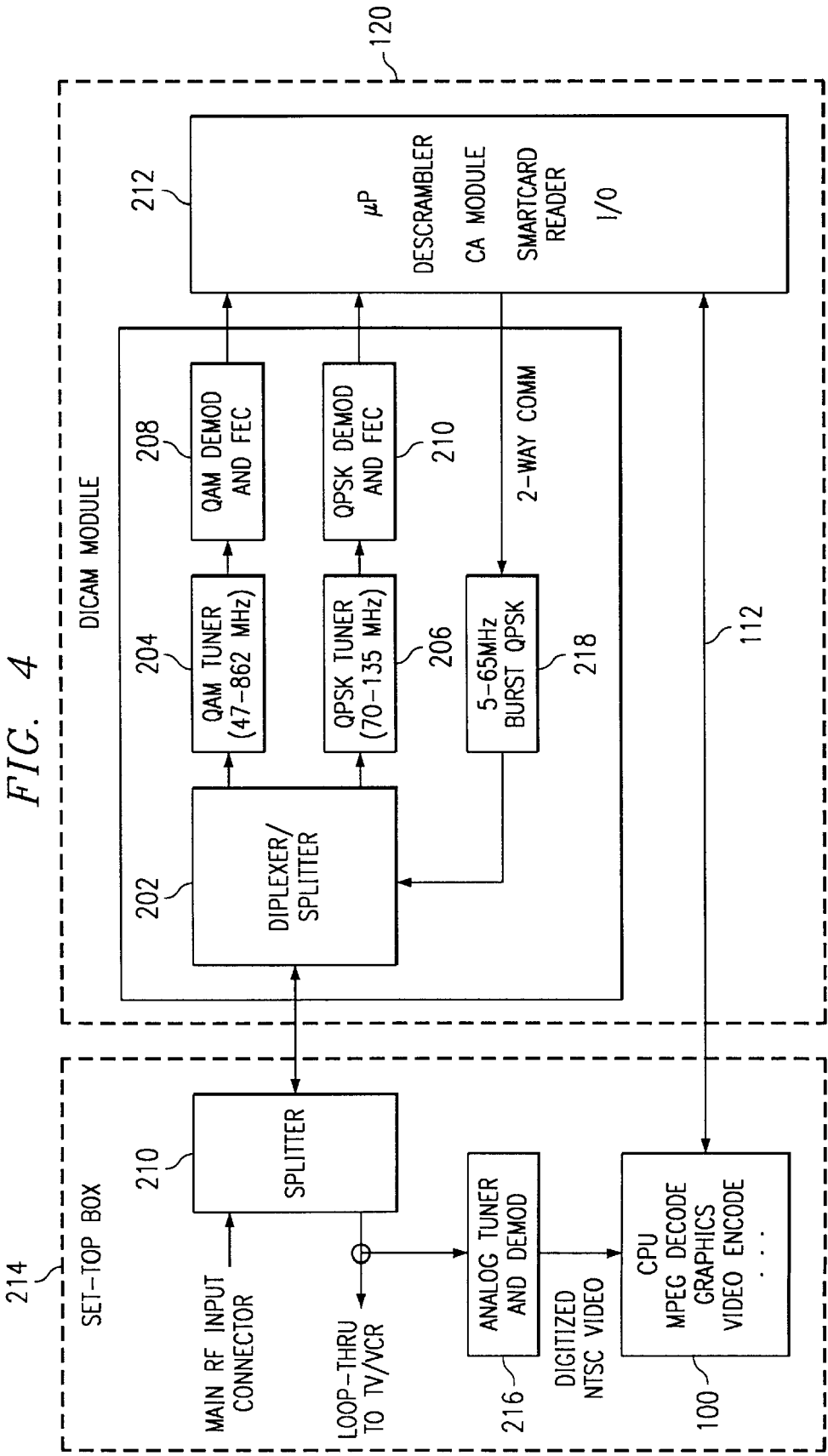
FIG. 4 is block diagram showing an example of one possible implementation of a DICAM unit in accordance with the invention.

FIG. 4 is block diagram showing an example of one possible implementation of a DICAM unit in accordance with the invention. An external splitter 200 provides an RF input signal to an internal diplexer/splitter 202, which provides separate signal paths to a quadrature amplitude modulation (QAM) tuner 204 for video signal processing, and a quadrature phase shift keying (QPSK) tuner 206 for data signal processing. The output of the QAM tuner 204 is coupled to a QAM demodulator/FEC module 208, while the output of the QPSK tuner 206 is coupled to a QPSK demodulator/FEC module 210. A processing module 212 incorporating control functions, descrambling and conditional access functions, an optional Smartcard reading function, and I/O functions then provides a descrambled transport stream 112 to a STUB 214. As shown, the STUB 214 includes the functions shown in STUB 100 in FIG. 3, plus a conventional analog tuner and demodulator 216.

An optional return path for 2-way communications is provided from the processing module 212 through a Burst QPSK encoder 218, which is coupled to the internal diplexer/splitter 202. This configuration allows return data to be transmitted to the RF source coupled by a bidirectional physical layer link. Such communication may use an out-of-band (OOB) control protocol and transmit data in accordance with the Multimedia Cable Network System (MCNS) protocol.

Another advantage of this DICAM architecture is retention of all tuning and demodulation functions for better control of video quality.

Figure 5:
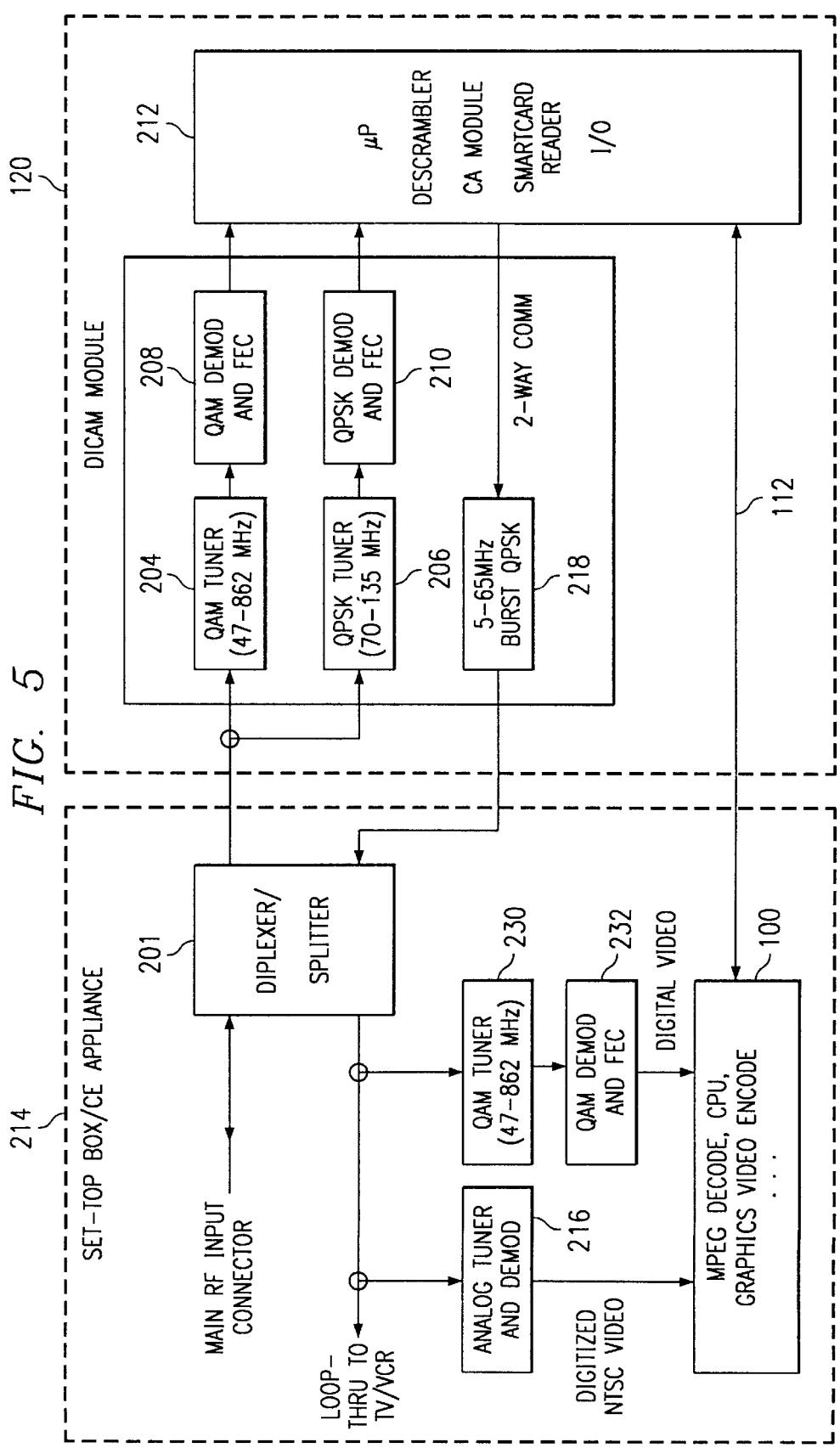
FIG. 5 is block diagram showing another example of a possible implementation of a DICAM unit in accordance with the invention.

FIG. 5 is block diagram showing another example of a possible implementation of a DICAM unit in accordance with the invention. This architecture is similar to the architecture shown in FIG. 4, as indicated by the like-referenced elements. However, this implementation uses an external diplexer/splitter 201, and the STUB 214 includes a QAM tuner 230 and QAM demodulator/FEC module 232. This implementation of a DICAM is particularly useful where the STUB 214 is integrated within a CE appliance (e.g., digital TV, DVD player, PC, etc.) having a built-in tuner. The CA function added by the DICAM can control provision of digital data (e.g., Internet communications) to the CE appliance.

Using the concepts of the invention, DICAMs can be implemented that take as inputs any of the following sources: satellite input (950–2150 MHz); cable input (47–862 MHz); MMDS input; LMDS input; digital terrestrial broadcast (e.g., High Definition TV or Standard Definition TV); analog TV (e.g., NTSC, PAL, SECAM); and digital audio/radio. DICAMs can be implemented to provide any of the following output signal types or protocols: serial bitstream; parallel bitstream; Universal Serial Bus; PCI bus; IEEE 1394 ("FireWire"); Fibre Channel; and Ethernet. The format of the output may be implemented to include any of the following: MPEG-1, 2, 3 or 4 bitstreams; ATM packets; and IP packets.

A number of embodiments of the present invention have been described. Nevertheless, it will be understood that various modifications may be made without departing from the spirit and scope of the invention. Accordingly, other embodiments are within the scope of the following claims.

What is claimed is:

1. An electronic broadband network communication system comprising:
   (a) a separate, connectable network-dependent digital interface conditional access module (DICAM) configured to receive an RF audiovisual signal, and generate therefrom an error-corrected digital signal in a transport stream, the DICAM including a stub;
   (b) a separate network-independent common module configured to be coupled to an electronically communicate with the DICAM, for receiving the transport stream and generating at least a video output signal therefrom, the common module including a socket coupled to the common module, wherein the stub is configured to be connected to the socket so as to allow the DICAM to electronically communicate with the common module.

2. An electronic broadband network communication system comprising:
   (a) a separate, connectable network-dependent digital interface conditional access module (DICAM) configured to receive an RF audiovisual signal, and including:
      (1) a tuner module for selecting a portion of the RF audiovisual signal;
      (2) a demodulation module for converting the selected RF audiovisual signal to a baseband signal;
      (3) a conversion module for converting a received baseband signal to a digital signal, and for performing error correction on the digital signal;
      (4) a connector for accommodating a security-and-conditional access (CA) module for descrambling and controlling dissemination of the error corrected digital signal as a transport stream;
      (5) a stub;
   (b) a separate network-independent common module configured to be coupled to an electronically communicate with the DICAM, and including:

(1) an audiovideo processing unit for receiving the transport stream and generating respective audio and video outputs therefrom; and (2) a video encoder for generating at least a video output signal;

(3) a socket, wherein the stub is configured to be connected to the socket so as to allow the DICAM to electronically communicate with the common module.

3. The system of claim 2, further including a security-and-conditional access module for descrambling and controlling dissemination of the error corrected digital signal as the transport stream.

4. The system of claim 3, wherein the security-and-conditional access module is embodied in a Smartcard.

5. The system of claims 1 or 2, wherein the DICAM is embodied in a PCMCIA compatible chassis.

6. A network-dependent digital interface conditional access module (DICAM) configured to be connectable to a separate network-independent common module for receiving a transport stream from the DICAM and generating at least a video output signal therefrom, the DICAM including:

(1) a tuner module for receiving and selecting a portion of the RF audiovisual signal;

(2) a demodulation module for converting the selected RF audiovisual signal to a baseband signal;

(3) a conversion module for converting a received baseband signal to a digital signal, and for performing error correction on the digital signal;

(4) a security-and-conditional access (CA) module for descrambling and controlling dissemination of the error corrected digital signal as the transport stream;

(5) a stub, configured to be connected to a socket of the common module so as to allow the DICAM to electronically communicate with the common module.

7. The module of claim 6, wherein the security-and-conditional access module is separately connectable to the DICAM.

8. The module of claim 7, wherein the security-and-conditional access module is embodied in a Smartcard.

9. The module of claim 7, wherein the DICAM is embodied in a PCMCIA compatible chassis.

10. A network-independent common module configured to be connectable to a separate network-dependent digital interface conditional access module (DICAM) configured to receive an RF audiovisual signal and generate therefrom an error-corrected digital signal in a transport stream to be provided to the common module, the common module including:

(1) a coupling for connecting to the DICAM;

(2) an audiovideo processing unit for receiving the transport stream and generating respective audio and video outputs therefrom;

(3) a video encoder for generating at least a video output signal;

(4) a socket configured to be connected to a stub of the DICAM so as to allow the DICAM to electronically communicate with the common module.

11. A method for partitioning functions in an electronic broadband network communication system comprising the steps of:

(a) providing a separate, connectable network-dependent digital interface conditional access module (DICAM) configured to receive an RF audiovisual signal, and generate therefrom an error-corrected digital signal in a transport stream;

(b) providing a separate network-independent common module configured to be coupled to an electronically communicate with the DICAM, for receiving the transport stream and generating at least a video output signal therefrom;

(c) providing a stub for the DICAM; and (d) providing a socket for the common module wherein the stub and the socket are configured to be connected so as to allow the common module to electronically communicate with the DICAM.

12. A method for partitioning functions in an electronic broadband network communication system comprising the steps of:

(a) providing a separate, connectable network-dependent digital interface conditional access module (DICAM) configured to receive an RF audiovisual signal, and generate therefrom an error-corrected digital signal in a transport stream;

(b) including within the DICAM:

(1) a tuner module for selecting a portion of the RF audiovisual signal;

(2) a demodulation module for converting the selected RF audiovisual signal to a baseband signal;

(3) a conversion module for converting a received baseband signal to a digital signal, and for performing error correction on the digital signal;

(4) a connector for accommodating a security-and-conditional access (CA) module for descrambling and controlling dissemination of the error corrected digital signal as a transport stream;

(5) a stub;

(c) providing a separate network-independent common module configured to be coupled to an electronically communicate with the DICAM;

(d) including within the network-independent common module:

(1) an audiovideo processing unit for receiving the transport stream and generating respective audio and video outputs therefrom;

(2) a video encoder for generating at least a video output signal;

(3) a socket wherein the stub is configured to be connected to the socket so as to allow the DICAM to electronically communicate with the common module.

* * * * *